(12) United States Patent
Olynyk

(10) Patent No.: US 6,510,442 B1
(45) Date of Patent: Jan. 21, 2003

(54) SYSTEM AND METHOD FOR IMPROVED DIGITAL DIFFERENTIAL ANALYZER

(75) Inventor: Kirk Olynyk, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/481,223

(22) Filed: Jan. 12, 2000

(51) Int. Cl.$^7$ .............................................. G06F 17/17
(52) U.S. Cl. ...................... 708/102; 708/290; 382/300
(58) Field of Search ................................ 708/102, 290; 382/300

(56) References Cited

U.S. PATENT DOCUMENTS

| | | | | |
|---|---|---|---|---|
| 3,934,130 A | * | 1/1976 | Friberg ........................ | 708/102 |
| 4,586,037 A | * | 4/1986 | Rosener et al. .............. | 345/418 |
| 5,025,405 A | * | 6/1991 | Swanson ..................... | 345/426 |
| 6,321,245 B1 | * | 11/2001 | Cukier et al. ............... | 708/290 |

OTHER PUBLICATIONS

Eker, Steven, "X.2 Faster Linear Interpolation," *Graphics Gems IV*, Paul S. Heckbert, ed., Academic Press, Inc., 1994, pp. 526–533.

* cited by examiner

*Primary Examiner*—David H. Malzahn
(74) *Attorney, Agent, or Firm*—Woodcock Washburn LLP

(57) ABSTRACT

A digital differential analyzer (DDA) is described that avoids using comparisons, and instead uses shifts, multiplies, and adds. Shifts are less costly to use in terms of processor time, and already exist in the hardware of a computer graphics system. The DDA provides improved linear interpolation procedures for use in computer graphics applications such as line drawing, computing polygon edges, texture mapping, and image scaling. The shifts are used to generate an "imposter" DDA having a larger denominator that substantially exactly simulates a DDA for a finite number of terms. The imposter DDA is a fixed point simulator of the original DDA that provides error-free approximations.

20 Claims, 3 Drawing Sheets

SYSTEM AND METHOD FOR IMPROVED DIGITAL DIFFERENTIAL ANALYZER

FIELD OF THE INVENTION

The present invention relates generally to computer graphics systems using applications such as line drawing, polygon edge computing, texture mapping, and image scaling. More particularly, the present invention relates to a digital differential analyzer using improved linear interpolation procedures for use in such computer graphics applications.

BACKGROUND OF THE INVENTION

In a computer graphics system, it is desirable to represent an object as efficiently as possible to preserve memory and system bandwidth, and to enhance rendering speed. Computer graphics, such as in computer generated images, animations and effects for motion pictures, television, computer multi-media, computer games, print and other media, often employ applications such as line drawing, polygon edge computing, texture mapping, image scaling, and Gouraud shading during rendering images of three-dimensional (3D) objects. Linear interpolation is one of the fundamental procedures in computer graphics applications. Because linear interpolation is often used at the lowest level in a graphics driver, it is desirable to perform the linear interpolation as rapidly as possible.

A digital differential analyzer (DDA) is a mathematical function that is used to linearly interpolate and quantize a mathematical model, such as the rendering of a line or other computer graphics applications. However, conventional DDAs are computation intensive because they use comparisons or divisions.

One such DDA is described in Eker, *Faster Linear Interpolation, Graphics Gems IV*, Edited by Heckbert, Academic Press, Inc., (1994) pp. 526–533. Eker's DDA requires the integer to be extracted from the result. This requirement is expensive in terms of processor time. Moreover, the DDA of Eker is restricted to linear interpolation directed to rounding with respect to the floor over a very small range.

There are a wide range of applications involving computer graphics in which it is necessary or desirable to provide efficient and accurate linear interpolation. Accordingly, the present invention provides an improved DDA that is efficient and accurate and avoids using comparisons.

SUMMARY OF THE INVENTION

This invention addresses the problem of providing improved (faster for a given amount of computer resources) linear interpolation procedures for use in computer graphics applications such as line drawing, computing polygon edges, texture mapping, and image scaling.

The present invention provides a digital differential analyzer (DDA) that avoids using comparisons that occur in the prior art DDAs, and instead uses shifts, multiplies, and adds. Shifts are less costly to use in terms of processor time, and already exist in the hardware of a computer graphics system. The present invention uses shifts to generate an "imposter" DDA having a larger denominator that substantially exactly simulates a DDA for a finite number of terms. The imposter DDA is a fixed point simulator of the original DDA that provides error-free approximations. Preferably, the imposter DDA is stored as a data structure in memory.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like reference numerals represent similar parts throughout the several views of the drawings, it being understood, however, that the invention is not limited to the specific methods and instrumentalities disclosed. In the drawings.

DETAILED DESCRIPTION OF THE INVENTION

In a computer graphics system, it is desirable to represent an object as efficiently as possible to preserve memory and system bandwidth, and to enhance rendering speed. The present invention provides a digital differential analyzer (DDA) that avoids using comparisons that occur in the prior art DDAs, and instead uses shifts, multiplies, and adds. Shifts, which act as DDAs for powers of 2, are desirable because they are less costly to use in terms of processor time, and already exist in the hardware of a computer graphics system. Thus, the present invention uses shifts to generate an "imposter" DDA having a larger denominator equal to a power of 2 that substantially exactly simulates a DDA for a finite number of terms. The imposter DDA is a fixed point simulator of the original DDA that provides error-free approximations within a well defined range.

Initially, an exemplary computing environment will be described within which the present invention may be embodied. Component details and exemplary instrumentalities will follow.

Exemplary Operating Environment

Figure 1:
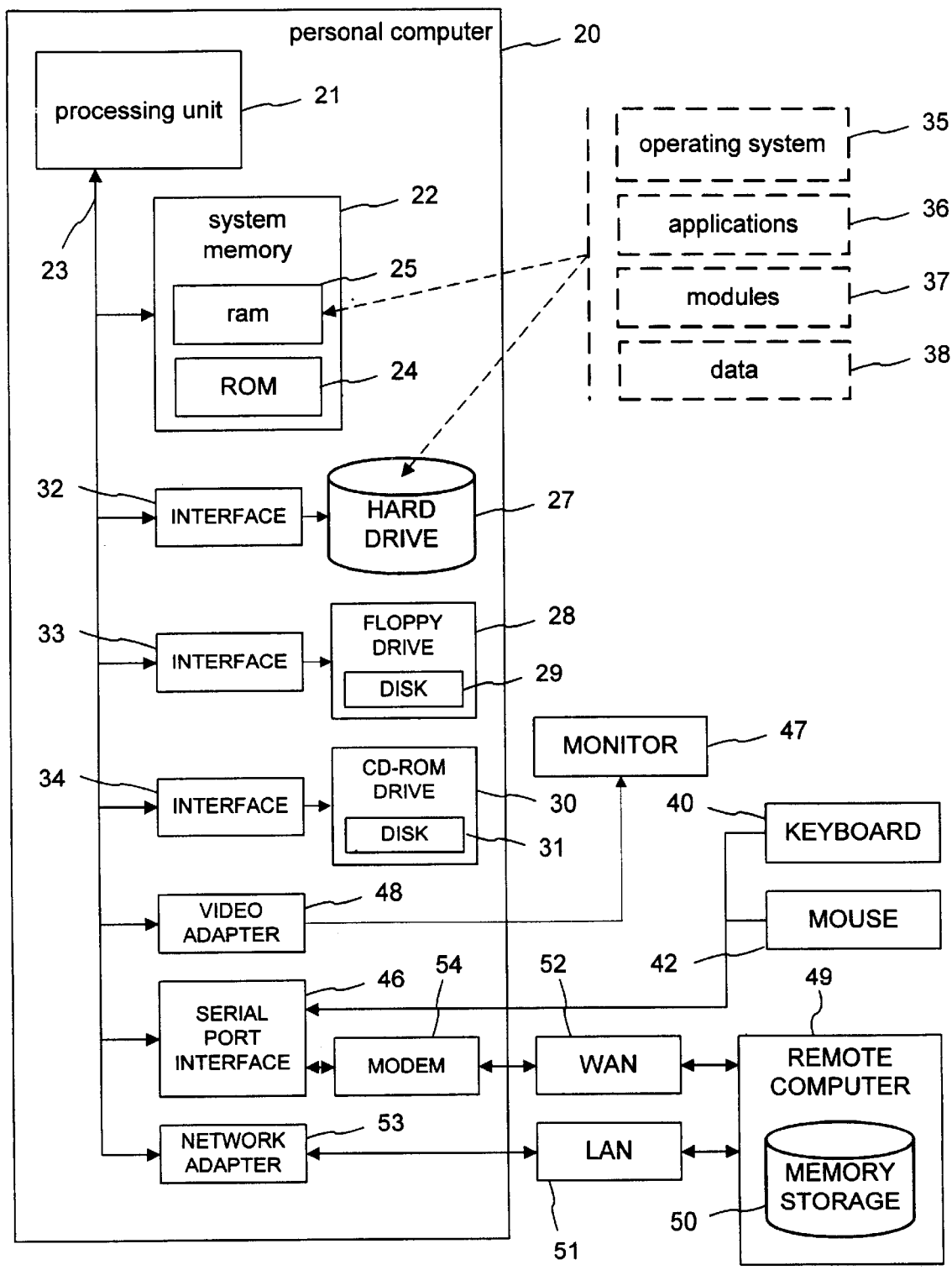
FIG. 1 is a block diagram of a computer system that can be used to implement a method and apparatus embodying the invention.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors. Dual microprocessors and other multiprocessor architectures also can be used as the processing unit 21.

The system bus may be any of several types of bus structure including a memory bus or memory controller, a peripheral bus, and a local bus using any of a variety of conventional bus architectures. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Description of DDA

Overview of DDA

Mathematically, a DDA can be defined as a mapping: Z×Z×Z×N→Z. That is, a DDA is an integer valued function whose arguments are three arbitrary integers, a, b, and c, followed by one positive integer, d>0, as given by the equation:

$$\{k, a, c, d\} \longrightarrow \left\lfloor \frac{ak+c}{d} \right\rfloor \in Z,$$

where a, b, c∈Z={ . . . ,−2,−1,0,1,2, . . . }, d∈N={1,2, . . . }, and k is an integer argument such that k=0, 1, 2, . . .

One typically uses a DDA when rendering a line on a computer display. Assuming a one pixel wide line is to be rendered in the first octant and that the line starts at the origin and ends at the integer coordinate pair (d,a), because the line is x major, only one pixel will be illuminated for each integral value of x=k. According to the Windows® convention, the integer y coordinate of the illuminate pixel is given by the equation:

$$f(k) = \left\lfloor \frac{ak + \lfloor (d-1)/2 \rfloor}{d} \right\rfloor.$$

Thus, rendering a line is evaluating a DDA. The line example is a special case of the general DDA function given by equation (1):

$$f(k) = \left\lfloor \frac{ak+c}{d} \right\rfloor, \quad (1)$$

where all the parameters are integers, and the denominator d is a positive integer. Rendering a line is just one example of the many models whose underlying mathematical structure is described by a DDA. Typically, a DDA is used to linearly interpolate and quantize a quantity of interest.

Typically, the DDA process is used to evaluate a linear function of an integer argument. That is, the DDA is used to evaluate f(k) for successive integer arguments: k=0,1, . . . A typical implementation of a DDA used to generate the sequence $\{f(k)\}_{k=0}^{k\ max}$ is given by the following process:

1. e←c mod d
2. f←⌊c/d⌋
3. δf←⌊a/d⌋
4. δe←a mod d
5. k←0
6. if ($k_{max}$≦k) then stop
7. print k, f
8. e←e+δe
9. f←f+δf
10. if (e<d) then go to Step 13
11. e←e−d
12. f←f+1
13. k←k+1
14. go to Step 6

Every term in the above DDA is an integer and it is easy to implement. DDAs provide linear interpolation to a wide range of mathematical models and rendering processes. For example, the inner loops of graphical rendering processes are often DDAs. Often, these inner loops are the hot spots of a rendering process so that any improvement in the speed of the DDA translates to an improvement of the speed of the rendering process.

Overview of Imposter DDA

In accordance with the present invention, it is desirable to abandon an original DDA in exchange for an improved "imposter" DDA whose coefficients are computationally more efficient. The imposter DDA is more computationally efficient because it has a denominator equal to a power of two, thereby replacing the original DDA with an equivalent fixed point calculation. A fixed point calculation is a type of calculation that has a fixed decimal point. Because the decimal point does not float, the calculation can be performed quicker and more efficiently. Furthermore, a fixed point calculation is preferable because the computer graphics hardware takes care of the carry test and branch (steps 10 and 11 above), and this is desirable because the speed of the operation increases. The increase in speed is significant especially when instruction cache resources are limited, although the increase is speed is desirable in all linear interpolation and rendering processes.

Typically, fixed point calculations are only an approximation. However, the results of the DDA of the present invention are identical to the results of the original DDA, within certain bounds.

In accordance with the present invention, any DDA can be simulated exactly for a finite number of terms by another DDA having a larger denominator. The present invention determines a replacement denominator that is equal to an integer power of 2 (e.g., replace k/3 with 85(k+1)/256, where k is the number of points in the model and 256 equal $2^8$). The DDA with the replacement denominator acts as a fixed point calculator of the original DDA. Thus, one benefit of the present invention is that a divide is replaced by a shift, an add, and a multiply, which are less processor-intensive and faster than a divide. Shifts, adds, and multiplies are more desirable than shifts in computer processing because they use fewer resources and execute faster. The power of 2 shift is part of the computer graphics hardware, thereby allowing a faster processing time.

The DDA of the present invention is valid over a range of interest. If the range of interest is predetermined, then the range of interest determines the denominator. Conversely, the denominator can be initially set in which case the range of interest is then determined based on the denominator. Thus, the denominator is a design constraint, as the DDA loses accuracy after a certain value of k. Put another way, the number of points being modeled is a design constraint that dictates the n'th power of 2 that the denominator should be raised to, $2^n$.

Construction of Imposter DDA

The present invention can be implemented in software suitable for the system described in FIG. 1. The present invention is directed to a DDA that simulates the conventional DDA defined by equation (1) above. The simulation or "imposter" DDA, f'(k), is given in equation (2):

$$f'(k) = \left\lfloor \frac{a'k + c'}{d'} \right\rfloor. \tag{2}$$

where, the values of a' and c' are given by:

$$a' = \left\lfloor \frac{ad'}{d} + \frac{1}{2} \right\rfloor \quad \text{and} \quad c' = \left\lfloor \frac{cd' - 1 + \hat{d}}{d} \right\rfloor,$$

where $\hat{d}=d$ for $\tilde{e}_a<0$, $\hat{d}=d'$ for $\tilde{e}_a\geq 0$, and $\tilde{e}_a=ad'-a'd$.

For these values of a' and c', the original and imposter DDAs are identical in the range 0≦k≦$\bar{k}$, where $$\bar{k} = \left\lfloor \frac{d' - d}{|\tilde{e}_n|} \right\rfloor.$$

There is a range over which the original and imposter DDAs are identical because fixed point calculations, which are used in the imposter DDAs, are only an approximation. When $\tilde{e}_a$ is zero, the range is infinite and the imposter DDA is identical to the original DDA for all values for k.

Figure 2:
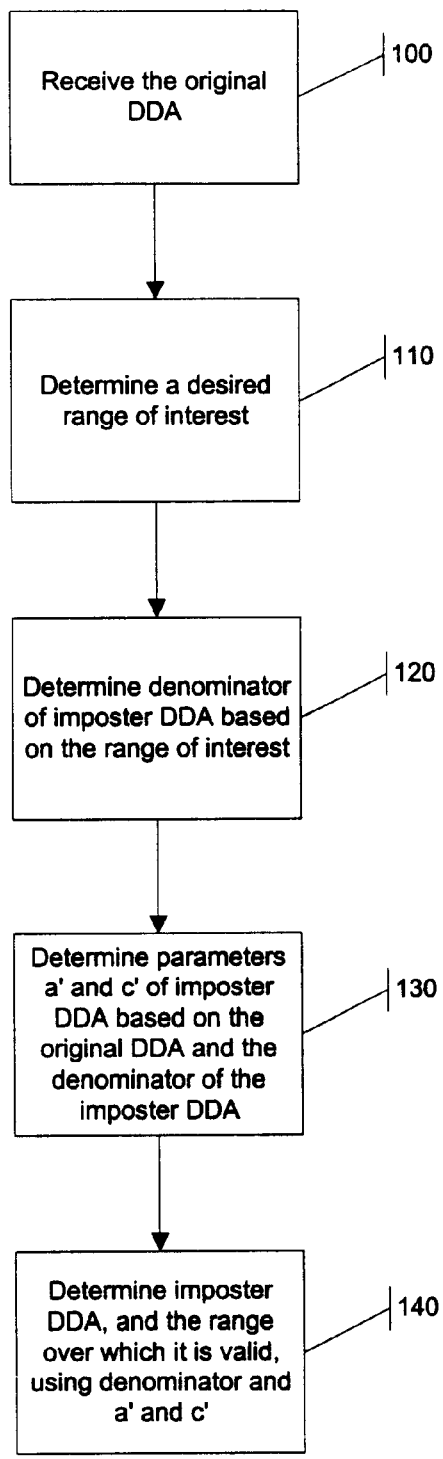
FIG. 2 is a flow diagram of an exemplary method of constructing a DDA in accordance with the present invention.

FIG. 2 is a flow chart of an exemplary method of determining the DDA in accordance with the present invention. At step 100, the original DDA is received. As described above, the original DDA has a function given by:

$$f(k) = \left\lfloor \frac{ak + c}{d} \right\rfloor,$$

where all the parameters are integers, and the denominator d is a positive integer. At step 110, a desired range of interest is determined or received (i.e., a level of accuracy is determined or received). In other words, it is determined over what approximate range of values of k (i.e., 0≦k≦upper limit) the imposter DDA should identically simulate the original DDA.

At step 120, the denominator d' of the imposter DDA is determined based on the desired range of interest. The denominator d' of the imposter DDA is preferably a power of 2 because the power of 2 shift is part of the computer graphics hardware, thereby allowing a faster processing time, as described above. The denominator d' is determined to be the power of 2 that is closest to the desired range of interest. For example, if the desired range of interest is for 0≦k≦1000, the denominator d' is determined to be 1024, which is $2^{10}$.

As described above, the imposter DDA has a function given by:

$$f'(k) = \left\lfloor \frac{a'k + c'}{d'} \right\rfloor.$$

At step 130, the parameters a' and c' of the imposter DDA are determined based on the parameters a and c from the original DDA and the denominator d' of the imposter DDA, using $$a' = \left\lfloor \frac{ad'}{d} + \frac{1}{2} \right\rfloor$$

and $$c' = \left\lfloor \frac{cd' - 1 + \hat{d}}{d} \right\rfloor,$$

where $\hat{d}=d$ for $\tilde{e}_a \leq 0$, $\hat{d}=d'$ for $\tilde{e}_a \geq 0$ and ad'–a'd. The imposter DDA is then determined, at step 140, based on the parameters a', c', and d'.

The range limit over which the DDA is valid is determined based on the denominator d'. It should be noted that the range limit can be given, and the denominator d' can be determined based on the range limit. It should also be noted that the imposter DDA is preferably stored as a data structure in memory so that it can be easily accessed for use in computer graphics rendering applications and other linear interpolation processes.

Because $|\tilde{e}_a| \leq \lfloor d/2 \rfloor$, an imposter DDA is produced that substantially matches the original in the range $$0 \leq k \leq \left\lfloor \frac{d' - d}{\lfloor d/2 \rfloor} \right\rfloor.$$

Exemplary Applications

One-Dimensional

A number of exemplary applications are now provided to describe how one-dimensional imposter DDAs are created and used.

To evaluate $\lfloor k/3 \rfloor$ for many different values of k, an imposter DDA can be used instead of calling the divide instruction, thereby increasing the evaluation speed. For this example, a fixed point scale factor of 256 is selected as d', although any fixed point scale factor, preferably a power of 2, such as 1024 (i.e., $2^{10}$), could be used. A DDA is used in accordance with the present invention, with a=1, c=0, and d=3. Using the above equations, $$a' = \left\lfloor \frac{256}{3} + \frac{1}{2} \right\rfloor = 85,$$

$\tilde{e}_a = 1.256 - 85.3 = 1$, $\hat{d} = 256$, and $$c' = \left\lfloor \frac{256 - 1}{3} \right\rfloor = 85.$$

Accordingly, the imposter DDA for dividing by three is $$f'(k) = \left\lfloor \frac{85(k+1)}{256} \right\rfloor.$$

In accordance with the above equations, the imposter DDA matches the original DDA for all k less than or equal to $$\bar{k} = \left\lfloor \frac{256 - 3}{1} \right\rfloor = 253.$$

The above equations provide a correct upper bound, though it is not necessarily the exact optimally large upper bound. For example, in this case, the first value at which the imposter DDA fails is k=258.

Thus, a divide has been replaced by an add, a multiply, and a shift.

As another example, to evaluate $\lfloor k/10 \rfloor$ for different values of k, which for example is useful for financial calculations, the original DDA has values of a=1, c=0, and d=10. Choosing $d'=2^{17}=131072$, the parameters for the imposter DDA are a'=c'=13107 and $\bar{k}=65531$. Therefore, a cheap, accurate, and quick way to divide any number ≦65531 by 10 without actually using the division operator (instead using an add, a multiply, and a shift) is $$f'(k) = \left\lfloor \frac{13107(k+1)}{2^{17}} \right\rfloor.$$

As another example, the original DDA for blending 8-bit colors is:

$$f(k) = \left\lfloor \frac{k}{255} + \frac{1}{2} \right\rfloor = \left\lfloor \frac{k + 127}{255} \right\rfloor.$$

The constants of the original DDA are a=1, c=127, and d=255. If d' is chosen to equal 65536, then a'=257, c'=257·128, and $\bar{k}=65281$. Thus, the imposter DDA is expressed as:

$$f'(k) = \left\lfloor \frac{(2^8 + 1)(k + 2^7)}{2^{16}} \right\rfloor.$$

This imposter DDA can be implemented in hardware as a simple combination of shift and addition operations:

t←k+128
t←ShiftLeft(t,8)+t
f←ShiftRight(t,16).

More than One Dimension

Figure 3:
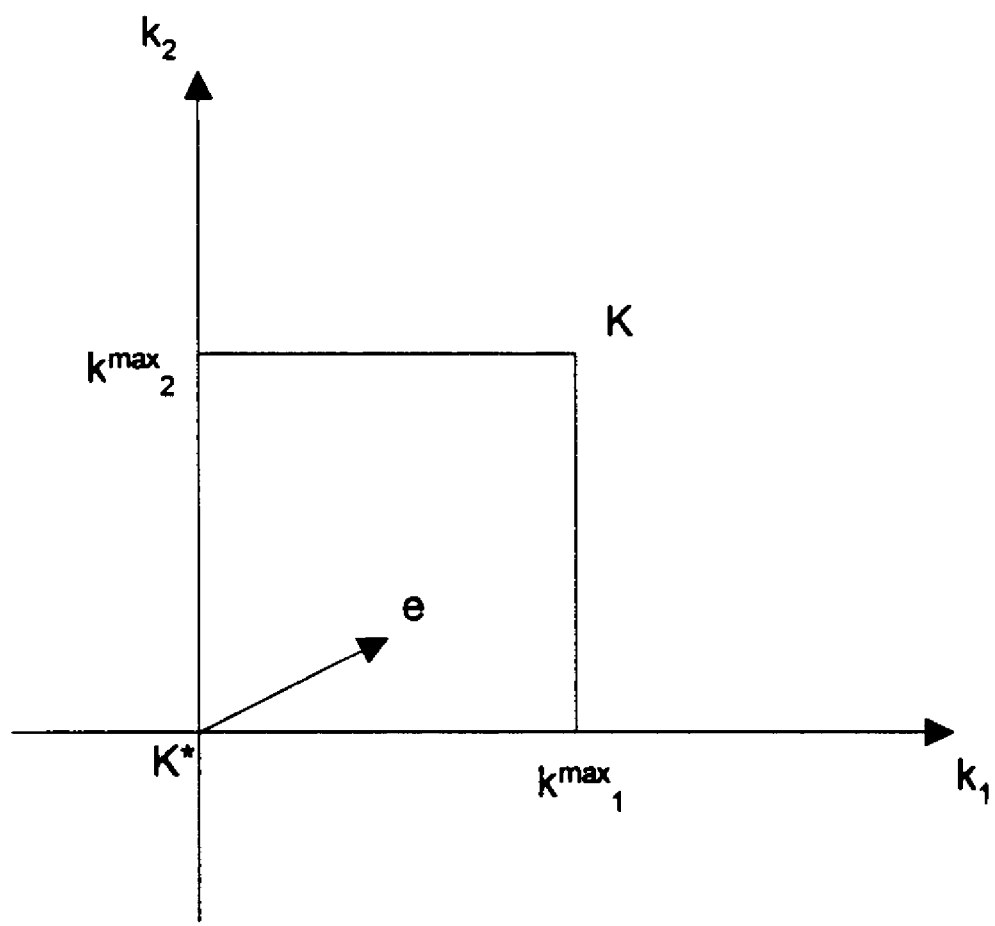
FIG. 3 is a diagram of the parameters of an exemplary two-dimensional DDA in accordance with the present invention.

DDAs having more than one dimension can also be simulated in accordance with the present invention. An example of the parameter space of a two-dimensional DDA is shown in FIG. 3, where K is an extreme maximum of the DDA, K* is an extreme minimum of the DDA, $k_1$ and $k_2$ define the set of allowed values of $k_j$ as an n-dimensional rectangle, and e is an exemplary vector in the parameter space. A higher-dimensional DDA is of the form:

$$f(\bar{k}) = \left\lfloor \frac{\bar{a} \cdot \bar{k} + c}{d} \right\rfloor.$$

Here $\bar{a}$ and $\bar{k}$ are n-dimensional vectors with integer valued components, the dot between them represents the usual scalar product. The present invention generates an imposter DDA of the form:

$$f'(\bar{k}) = \left\lfloor \frac{\bar{a}' \cdot \bar{k} + c'}{d'} \right\rfloor.$$

Letting each of the n components of $\bar{a}$ be given by:

$$a'_j = \left\lfloor \frac{a_j d'}{d} + \frac{1}{2} \right\rfloor \equiv \frac{a_j d' - e_j}{d}$$

where each of the n elements of $\bar{e}$ satisfies $-\lfloor d/2 \rfloor \leq e_j < d - \lfloor d/2 \rfloor$. The imposter DDA and the original DDA give the same result if and only if $$0 \leq -\bar{e} \cdot \bar{k} + c'd - (c - \epsilon(\bar{k}))d' < dd' \qquad (3)$$

where $\epsilon(\bar{k}) = \bar{a} \cdot \bar{k} + c - df(\bar{k})$ and $0 < \epsilon(\bar{k}) \leq d-1$. As in the one-dimensional case, the coordinate system can be translated so that $0 \leq k_j \leq k_j^{max}$ for $0 \leq j \leq n$. The extremal values of the linear function of $\bar{k}$ given by $$\bar{e} \cdot \bar{k} = \sum_{j=1}^{n} e_j k_j$$

occur at the vertices of the rectangle. Thus, if $\bar{k} = \bar{K}$ is an extrema of $\bar{k} \cdot \bar{e}$, then $K_j = 0, k^{max}_j$. $\bar{K}^*$ is the vector obtained by reflecting $\bar{K}$ about the center of the convex region. A property of an extrema is that if $\bar{K}$ is a maxima, then $\bar{K}^*$ is a minima, and vice versa.

Here, the location of one of the maxima is denoted $\bar{K}$, and the corresponding maximal value of linear is denoted $$\lambda \max = \bar{K} \cdot \bar{e} = \max\{\bar{k} \cdot \bar{e}\}_{\bar{K} \in R}.$$

The corresponding minima is located at $\bar{K}^*$ and the value of the linear function at the minima is $$\lambda \min = \bar{K}^* \cdot \bar{e} = \min\{\bar{k} \cdot \bar{e}\}_{\bar{K} \in R}.$$

The inequalities in equation (3) can be replaced by the restrictive, but easier to solve, inequalities:

$$\frac{cd' - \lambda \min}{d} \leq c' \leq \frac{(c+1)d' - \lambda \max}{d}.$$

The worst situation manifests itself as:

$$\lambda \min = -\lfloor d/2 \rfloor \sum_{j=1}^{n} k_j^{max}$$

and $\lambda \max = 0$.

$$K = \sum_{j=1}^{n} k_j^{max},$$

the worst case for the restricted inequalities becomes:

$$\frac{cd' + \lfloor d/2 \rfloor K}{d} \leq c' < \frac{(c+1)d'}{d}.$$

The optimal value of c' is given by $$c_{\max} = \left\lfloor \frac{(c+1)d' - 1}{d} \right\rfloor$$

Substituting that value of c' into the right-hand inequality yields:

$$\max\{K\} = \left\lfloor \frac{d' - d}{\lfloor d/2 \rfloor} \right\rfloor$$

Conclusion

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A computer-implemented process for generating a data structure that simulates a digital differential analyzer (DDA) that represents a function, the DDA having parameter values a and c, and a denominator d, comprising:

receiving a range of accuracy over which the data structure is valid;

determining a new denominator d' having an integer power of 2 in accordance with the range of accuracy, the new denominator d' replacing the denominator d in the DDA; and determining new parameter values a' and c' based on the new denominator d', the new parameter values a' and c' replacing the parameter values a and c in the DDA to simulate the DDA.

2. The process according to claim 1, wherein the simulated DDA takes the form $$f'(k) = \left\lfloor \frac{a'k + c'}{d'} \right\rfloor.$$

3. The process according to claim 1, wherein the values of a' and c' are given by $$a' = \left\lfloor \frac{ad'}{d} + \frac{1}{2} \right\rfloor \quad \text{and} \quad c' = \left\lfloor \frac{cd' - 1 + \hat{d}}{d} \right\rfloor,$$

wherein $\hat{d}=d$ for $\tilde{e}_a \leq 0$, $\hat{d}=d'$ for $\tilde{e}_a \geq 0$, and $\tilde{e}_a = ad' - a'd$.

4. The process according to claim 3, wherein the simulated DDA is valid in the range of accuracy $0 \leq k \leq \overline{k}$, wherein $$\overline{k} = \left\lfloor \frac{d' - d}{|\tilde{e}_a|} \right\rfloor.$$

5. The process according to claim 1, wherein the DDA is at least one-dimensional.

6. A computer readable medium having computer-executable instructions for performing the steps recited in claim 1.

7. The computer readable medium according to claim 6, wherein the simulated DDA takes the form $$f'(k) = \left\lfloor \frac{a'k + c'}{d'} \right\rfloor.$$

8. The computer readable medium according to claim 6, wherein the values of a' and c' are given by $$a' = \left\lfloor \frac{ad'}{d} + \frac{1}{2} \right\rfloor \quad \text{and} \quad c' = \left\lfloor \frac{cd' - 1 + \hat{d}}{d} \right\rfloor,$$

wherein $\hat{d}=d$ for $\tilde{e}_a \leq 0$, $\hat{d}=d'$ for $\tilde{e}_a \geq 0$, and $\tilde{e}_a = ad' - a'd$.

9. The computer readable medium according to claim 8, wherein the simulated DDA is valid in the range of accuracy $0 \leq k \leq \overline{k}$, wherein $$\overline{k} = \left\lfloor \frac{d' - d}{|\tilde{e}_a|} \right\rfloor.$$

10. The computer readable medium according to claim 6, wherein the DDA is at least one-dimensional.

11. A data structure stored in a computer readable memory that simulates a digital differential analyzer (DDA) that represents a function, the DDA having parameter values a and c, and a denominator d, wherein the data structure has a range of accuracy, wherein the data structure is useable to determine a new denominator d' having an integer power of 2 in accordance with the range of accuracy, the new denominator d' replacing the denominator d in the DDA, wherein new parameter values a' and c' are selectable based on the new denominator d', wherein the new parameter values a' and c' replace the parameter values a and c in the DDA to simulate the DDA.

12. The data structure according to claim 11, wherein the simulated DDA takes the form $$f'(k) = \left\lfloor \frac{a'k + c'}{d'} \right\rfloor.$$

13. The data structure according to claim 11, wherein the values of a' and c' are given by $$a' = \left\lfloor \frac{ad'}{d} + \frac{1}{2} \right\rfloor \quad \text{and} \quad c' = \left\lfloor \frac{cd' - 1 + \hat{d}}{d} \right\rfloor,$$

wherein $\hat{d}=d$ for $\tilde{e}_a < 0$, $\hat{d}=d'$ for $\tilde{e}_a \geq 0$, and $\tilde{e}_a = ad' - a'd$.

14. The data structure according to claim 13, wherein the simulated DDA is valid in the range of accuracy $0 \leq k \leq \overline{k}$, wherein $$\overline{k} = \left\lfloor \frac{d' - d}{|\tilde{e}_a|} \right\rfloor.$$

15. The data structure according to claim 11, wherein the DDA is at least one-dimensional.

16. In a computer implemented device having a graphics engine, and a computer readable storage medium having computer executable components, the computer executable components comprising:

a data store for storing data describing a digital differential analyzer (DDA) that represents a function, the DDA having parameter values a and c, and a denominator d;

a processor for reading the data store, receiving a range of accuracy over which a simulated DDA is to be valid, the simulated DDA representing the DDA, determining a new denominator d' having an integer power of 2 in accordance with the range of accuracy, the new denominator d' replacing the denominator d in the DDA, and determining new parameter values a' and c' based on the new denominator d', the new parameter values a' and c' replacing the parameter values a and c in the DDA to simulate the DDA.

17. The device according to claim 16, wherein the simulated DDA takes the form $$f'(k) = \left\lfloor \frac{a'k + c'}{d'} \right\rfloor.$$

18. The device according to claim 16, wherein the values of a' and c' are given by $$a' = \left\lfloor \frac{ad'}{d} + \frac{1}{2} \right\rfloor \quad \text{and} \quad c' = \left\lfloor \frac{cd' - 1 + \hat{d}}{d} \right\rfloor,$$

wherein $\hat{d}=d$ for $\tilde{e}_a < 0$, $\hat{d}=d'$ for $\tilde{e}_a \geq 0$, and $\tilde{e}_a = ad' - a'd$.

19. The device according to claim 18, wherein the simulated DDA is valid in the range of accuracy $0 \leq k \leq \overline{k}$, wherein $$\overline{k} = \left\lfloor \frac{d' - d}{|\tilde{e}_a|} \right\rfloor.$$

20. The device according to claim 16, wherein the DDA is at least one-dimensional.

* * * * *